United States Patent
Lin et al.

(10) Patent No.: US 6,912,025 B2
(45) Date of Patent: Jun. 28, 2005

(54) LIQUID CRYSTAL DISPLAY DEVICE

(75) Inventors: Bi Ly Lin, Tainan Science-Based Industrial Park (TW); Sungsoo Park, Tainan Science-Based Industrial Park (TW); Rung Nan Lu, Tainan Science-Based Industrial Park (TW)

(73) Assignee: Chi Mei Optoelectronics Corp., Tainan (TW)

( * ) Notice: Subject to any disclaimer, the term of this patent is extended or adjusted under 35 U.S.C. 154(b) by 10 days.

(21) Appl. No.: 10/372,814

(22) Filed: Feb. 26, 2003

(65) Prior Publication Data

US 2004/0165127 A1 Aug. 26, 2004

(51) Int. Cl.[7] .................. G02F 1/1333; G02F 1/1339
(52) U.S. Cl. ............................. 349/110; 349/153
(58) Field of Search .................... 349/110, 153–157

(56) References Cited

U.S. PATENT DOCUMENTS

| | | | |
|---|---|---|---|
| 5,263,888 A | | 11/1993 | Ishihara et al. ............... 445/25 |
| 6,259,505 B1 | * | 7/2001 | Makino ....................... 349/153 |
| 2002/0196393 A1 | * | 12/2002 | Tashiro et al. .............. 349/106 |
| 2003/0016328 A1 | * | 1/2003 | Chung et al. ................ 349/149 |
| 2004/0017526 A1 | * | 1/2004 | Kuo ............................ 349/110 |

* cited by examiner

*Primary Examiner*—Dung T. Nguyen
(74) *Attorney, Agent, or Firm*—Finnegan, Henderson, Farabow, Garrett & Dunner, L.L.P.

(57) ABSTRACT

A liquid crystal display device mainly includes a first substrate, a second substrate, and a liquid crystal layer sandwiched between the first and the second substrates. The first substrate is attached to the second substrate by a radiation-cured sealant. The first substrate is provided with a light-shielding frame around the display area, wherein the frame forms the corners into a nonrectangular shape and superposes over a substantial portion of the sealant.

17 Claims, 6 Drawing Sheets

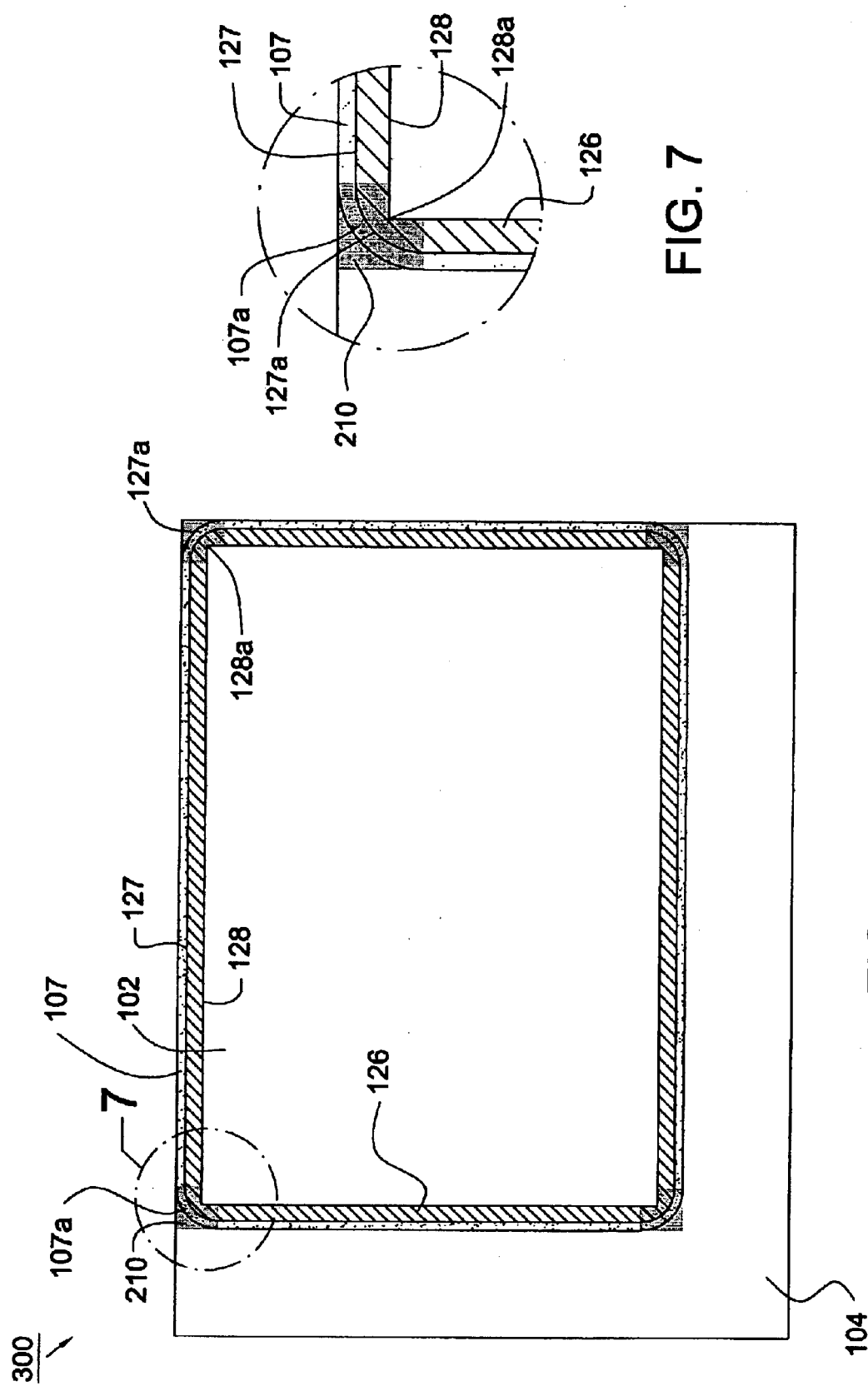

LIQUID CRYSTAL DISPLAY DEVICE

BACKGROUND OF THE INVENTION

1. Field of the Invention

The present invention relates to a liquid crystal display (LCD) device, and more particularly to a liquid crystal display device using a radiation-cured sealant.

2. Description of the Related Art

Liquid crystal displays typically comprise two oppositely positioned first and second substrates and a liquid crystal layer interposed therebetween. In the field of flat panel displays, the two substrates may be affixed to each other with a thermosetting epoxy. However, this method takes considerable processing time for completion of liquid crystal injection.

Recently, U.S. Pat. No. 5,263,888 discloses a one drop fill (ODF) method comprising the steps of applying an adhesive onto the entire periphery of the first substrate, dropping the liquid crystal material to the first substrate, superposing the second substrate upon the first substrate and pressing the substrates until a gap between the substrates reaches a predetermined value (typically 3–10 micrometers), and curing the adhesive. In the step of pressing the substrates, the liquid crystal material spreads to fill the space between the substrates thereby forming the liquid crystal layer under a preferably controlled cell gap. This method significantly shortens the process time and increases the manufacturing efficiency. However, this one-drop fill method cannot use the thermosetting epoxy but must use instead a UV curable sealant which cures near room temperature.

FIG. 10 shows a portion of a conventional liquid crystal display device 900. As shown in FIG. 10, the liquid crystal display device 900 mainly includes a first substrate 902 and a second substrate 904 disposed to face each other with a predetermined gap therebetween. A liquid crystal layer 906 is sandwiched between the substrates 902 and 904. The substrates 902 and 904 are affixed to each other by a sealant 907. Specifically, the first substrate 902 is provided with a plurality of colored patterns 918 (only one is shown in FIG. 10), a counter electrode (not shown) and a black matrix 922. The second substrate 904 is provided with a plurality of addressing lines 908 and pixel electrodes 916. The black matrix 922 is typically made of a light-blocking material to deter external light from entering the display device. As shown in FIG. 10, when a UV curable sealant is used to seal the liquid crystal display device 900, it is necessary to have the sealant 907 provided in the periphery of the black matrix 922 to allow sufficient light to enter the liquid crystal display device from the substrate 902 to reach the sealant 907. However, the wide dispensing area of the sealant may undesirably increase the panel size and reduce the space for other circuit design. The present invention therefore seeks to provide a liquid crystal display device that overcomes or at least reduces the above-mentioned problems of the prior art.

SUMMARY OF THE INVENTION

It is an object of the invention to significantly reduce the overall size of liquid crystal display devices having two substrates affixed to each other by a UV curable sealant. These devices are associated with the "one drop fill" method since it is becoming the preferred manufacturing method thereof.

It is another object of the invention to prevent deleterious mixing of the liquid crystal material with any potentially incurable sealants thereby significantly suppressing mura occurrence owing to incomplete UV curing.

The liquid crystal display device according to the present invention mainly comprises a first substrate, a second substrate and a liquid crystal layer sandwiched between the first and the second substrates. The first substrate is attached to the second substrate by a radiation-cured sealant (e.g., a UV-curing sealant) located in the vicinity of a display area of the first substrate. The first substrate is provided with a light-shielding frame (e.g., a portion of a black matrix). The inner contour of the light-shielding frame defines a display area. The outer contour of the light-shielding frame has at least one corner being formed into a nonrectangular shape. The overall size of the device is significantly reduced by the design that at least a portion of the light-shielding frame overlaps the UV-curing sealant and covers the outer contour of the light-shielding frame. The width of the overlapping area is measured substantially larger than the UV-curing sealant. This design is to allow sufficient light to enter the liquid crystal display device from the first substrate to reach the UV-curing sealant thereby significantly suppressing mura occurrence owing to incomplete UV curing.

According to the present invention, the nonrectangular corner of the outer contour of the light-shielding frame is provided at a location corresponding to one round corner of the sealant. This design allows sufficient UV light to enter the liquid crystal display device from the first substrate thereby helping to completely cure the sealant particularly around the round corner thereof.

According to the present invention, the second substrate is provided with an opaque pattern formed in a position facing the nonrectangular corners of the light-shielding frame. This design helps to prevent deterioration of contrast deriving from leakage of light passing through the vicinity of the nonrectangular corners.

According to the present invention, the second substrate is provided with another opaque pattern formed along the outer contour of the light-shielding frame. This design helps to prevent deterioration of contrast deriving from leakage of light passing through the vicinity of the edge of the light-shielding frame.

BRIEF DESCRIPTION OF THE DRAWINGS

Other objects, advantages, and novel features of the invention will become more apparent from the following detailed description when taken in conjunction with the accompanying drawings.

FIG. 6 is a plan view of a liquid crystal display device according to a third embodiment of the present invention;

FIG. 7 shows, in an enlarged plan view, one corner of the liquid crystal display device of FIG. 6;

DETAILED DESCRIPTION OF THE PREFERRED EMBODIMENT

Figure 1:
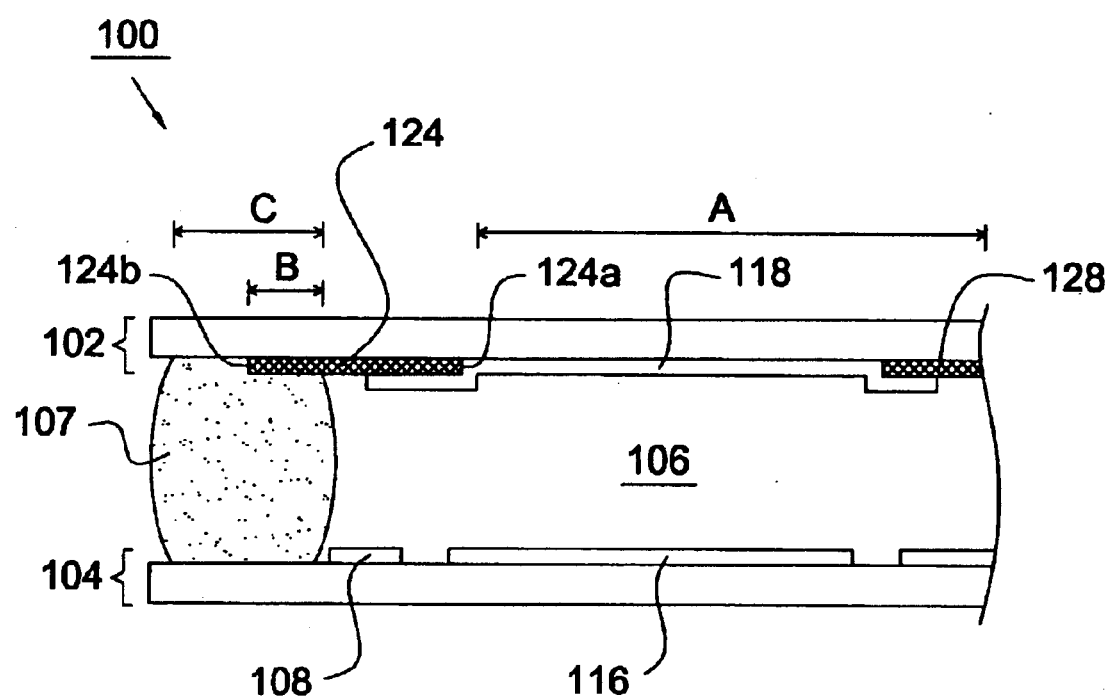
FIG. 1 is a sectional view of a portion of a liquid crystal display device according to a first embodiment of the present invention.
Figure 3:
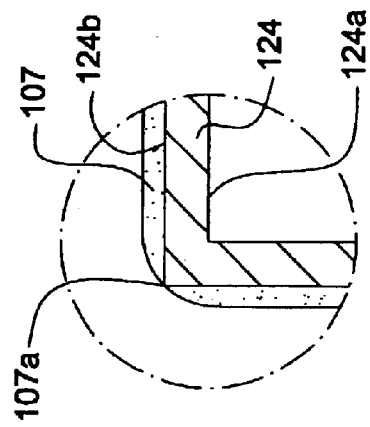
FIG. 3 shows, in an enlarged plan view, one corner of the liquid crystal display device of FIG. 2.
Figure 2:
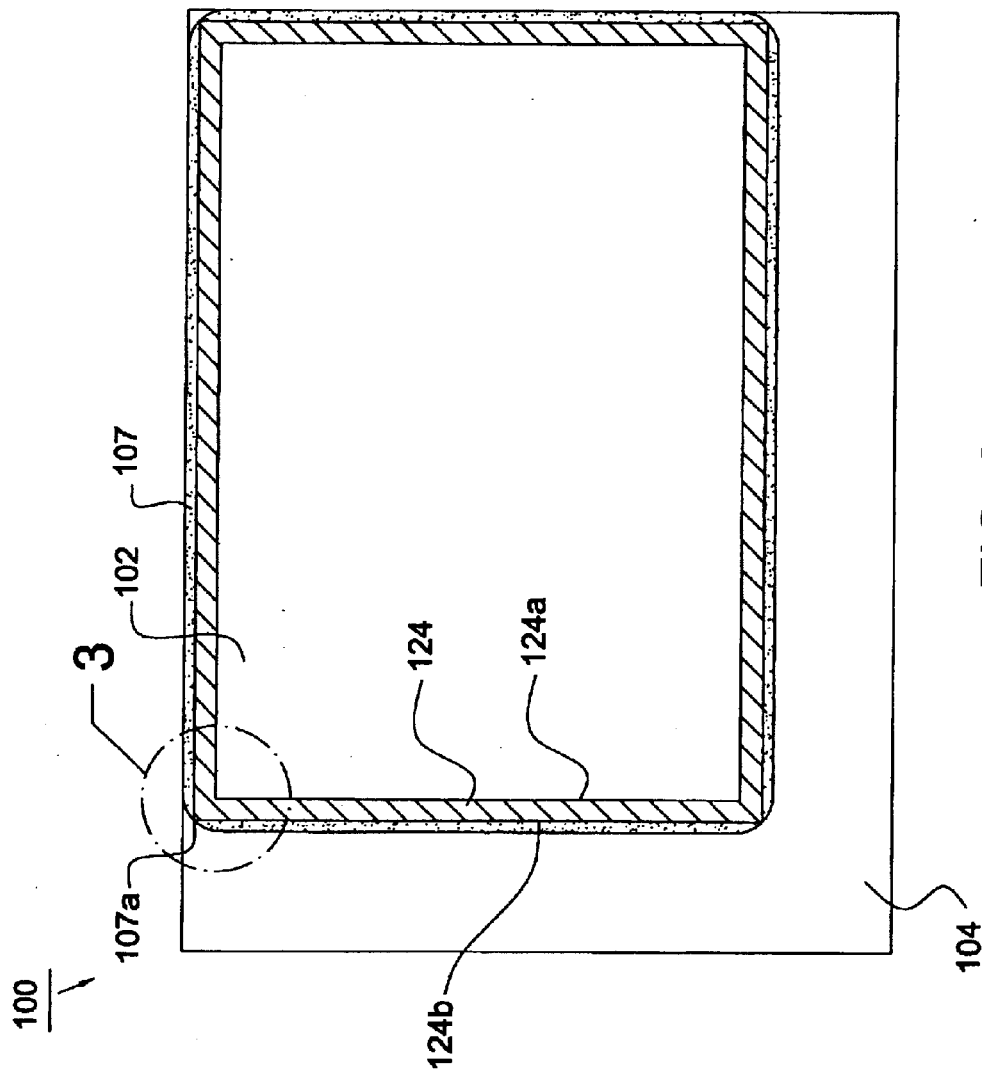
FIG. 2 is a plan view of a liquid crystal display device according to the first embodiment of the present invention.

FIGS. 1–3 show a liquid crystal display device 100 according to a first embodiment of the present invention. As shown in FIG. 1, the liquid crystal display device 100 mainly includes a first substrate 102 and a second substrate 104 disposed to face each other with a predetermined gap therebetween. A liquid crystal layer 106 is sandwiched between the substrates 102 and 104. The substrates 102 and 104 are affixed to each other by a radiation-cured sealant 107 such as a UV curable sealant. Specifically, the first substrate 102 is provided with a plurality of colored patterns 118 (only one is shown in FIG. 1), a counter electrode (not shown) and a light-shielding matrix such as a black matrix. The light-shielding matrix includes a light-shielding frame 124 and a plurality of columns 128 (only one is shown in FIG. 1) and rows (not shown). The inner contour 124a of the light-shielding frame 124 defines a display area A. The outer contour 124b of the light-shielding frame 124 has four corners each being formed into a rectangular shape. The columns 128 and rows of the light-shielding matrix are formed into a desired pattern in the display area A. Each of the columns and rows of the light-shielding matrix is located between two of the colored patterns. As shown in FIG 1, the second substrate 104 is provided with a plurality of data bus lines 108 formed in parallel to one another, a plurality of gate bus lines (not shown), vertically to the data bus lines, formed in parallel to one another, and thin film transistors (not shown) and pixel electrodes 116 formed like a matrix at intersections between the data bus lines 108 and gate bus lines. Typically, the first substrate 102 is referred to as a color filter (CF) substrate because color patterns are formed, while the second substrate 104 is referred to as a TFT substrate. Usually, spacers (not shown) are formed between the substrates for defining a gap between the substrates. As shown in FIG. 1, at least a portion of the radiation-cured sealant 107 overlaps the light-shielding frame 124 and covers the outer contour 124b of the light-shielding frame 124. As shown in FIG. 1, the overlapping area between the outer contour 124b of the light-shielding frame 124 and the radiation-cured sealant 107 has a width B.

Addressing the problem by implementation of the "one drop fill" method in a liquid crystal display as described above, the inventors found out the solution to incomplete UV curing by particularly keeping the width B of the overlapping area substantially less than the width C of the sealant 107. Preferably, the width B of the overlapping area is substantially kept at most half of the width C of the sealant 107, thereby further suppressing mura occurrence owing to incomplete UV curing.

Typically, the sealant 107 is formed by dispensing a narrow filament of sealant material onto the substrate 102. Therefore, the sealant 107 is formed substantially in a rectangular shape having four round corners 107a (see FIG. 3). However, the outer contour 124b of the light-shielding frame 124 is typically formed in a rectangular shape with sharp corners. Therefore, when the liquid crystal display device 100 is utilizing "one drop fill" method, incomplete curing can easily be observed in the corners 107a of the sealant 107 because the UV light is unable to reach the corners 107a of the sealant 107 due to shadows cast by the light-shielding frame 124. It could be understood that the columns and rows of the light-shielding matrix are not shown in FIGS. 2–3.

Figure 5:
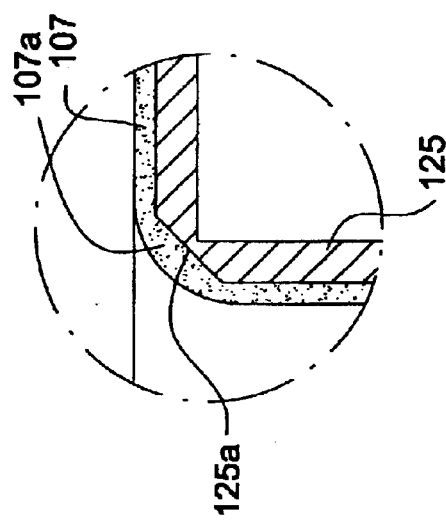
FIG. 5 shows, in an enlarged plan view, one corner of the liquid crystal display device of FIG. 4.
Figure 4:
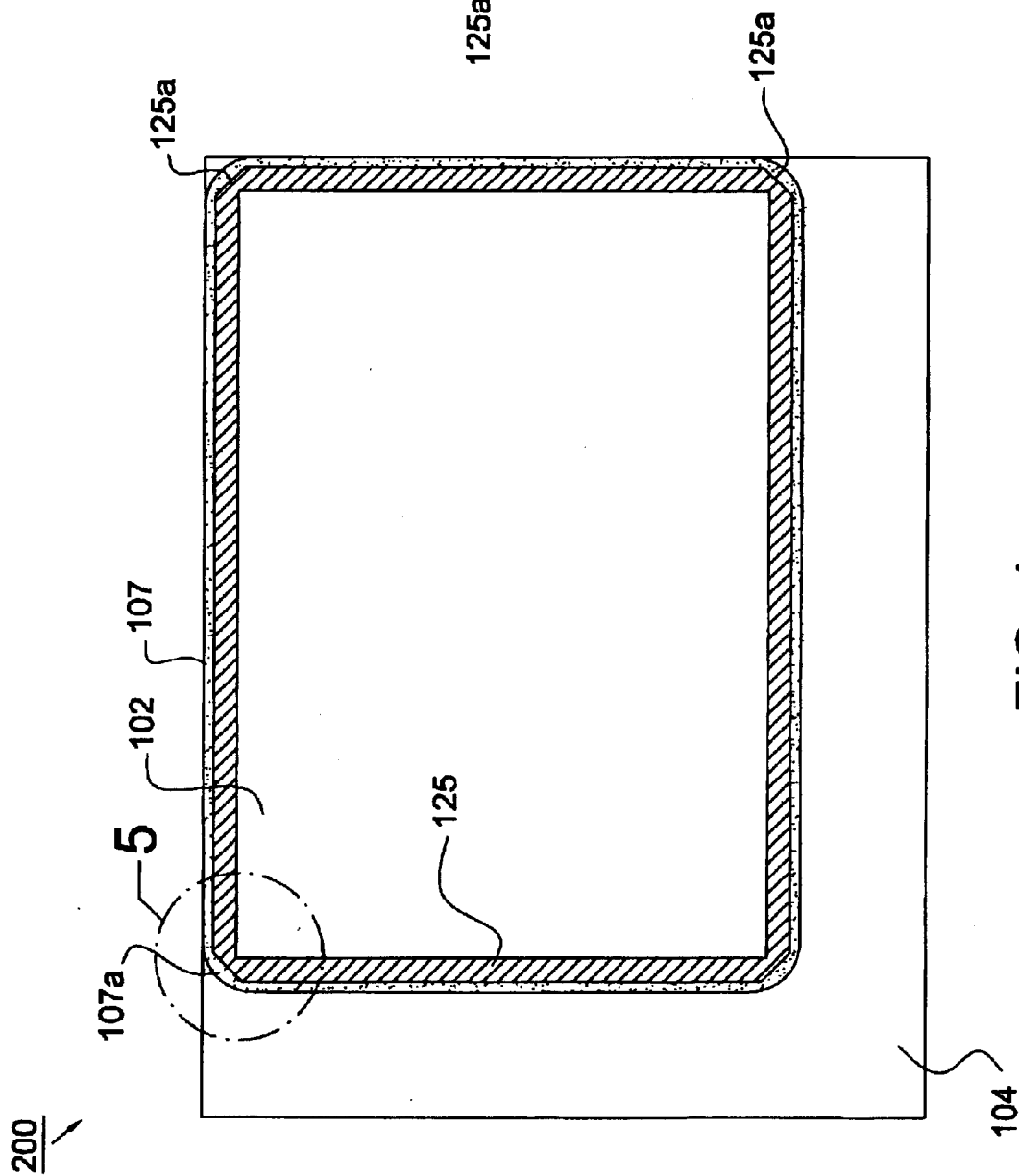
FIG. 4 is a plan view of a liquid crystal display device according to a second embodiment of the present invention.

FIGS. 4–5 show a liquid crystal display device 200 according to a second embodiment of the present invention. The liquid crystal display device 200 is substantially identical to the liquid crystal display device 100 shown in FIGS. 1–3 with an exception that the light-shielding matrix of the device 200 has a light-shielding frame 125 wherein the outer contour of the frame 125 having four corners formed into an nonrectangular shape such as four beveled corners 125a as shown in FIG. 5 thereby allowing sufficient UV light to enter the device 200 from the first substrate 102 to reach the corners 107a of the sealant 107.

FIGS. 6–7 show a liquid crystal display device 300 according to a third embodiment of the present invention. The liquid crystal display device 300 is substantially identical to the liquid crystal display device 200 shown in FIGS. 4–5 with an exception that the light-shielding matrix of the device 200 has a frame 126 with the four corners 127a of the outer contour 127 being formed in a round shape as shown in FIG. 7 thereby allowing sufficient UV light to enter the device 200 from the first substrate 102 to reach the corners 107a of the sealant 107. It is noted that the inner contour 128 of the light-shielding frame 126 may have four corners 128a being formed in a rectangular shape as shown in FIG. 7. Preferably, the device 300 includes an opaque pattern 210 provided on the second substrate 104 at a position facing the round corners 127a of the outer contour 127 of the frame 126 thereby helping to prevent deterioration of contrast deriving from leakage of light passing through the vicinity of the rounded corners 127a. It is noted that the opaque pattern 210 is provided at a position completely outside the display area defined by the inner contour 128 of the light-shielding frame 126. Specifically, the opaque pattern 210 may be formed from any metal layer provided on the second substrate 104, e.g., the gate metal layer, the data metal layer or the metal layer constructed conductively to be fed with a common voltage (Vcom).

Figure 9:
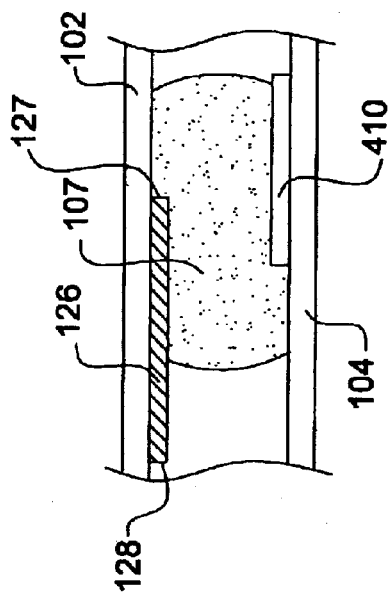
FIG. 9 is a cross-sectional view taken along line 9—9 of FIG. 7.
Figure 8:
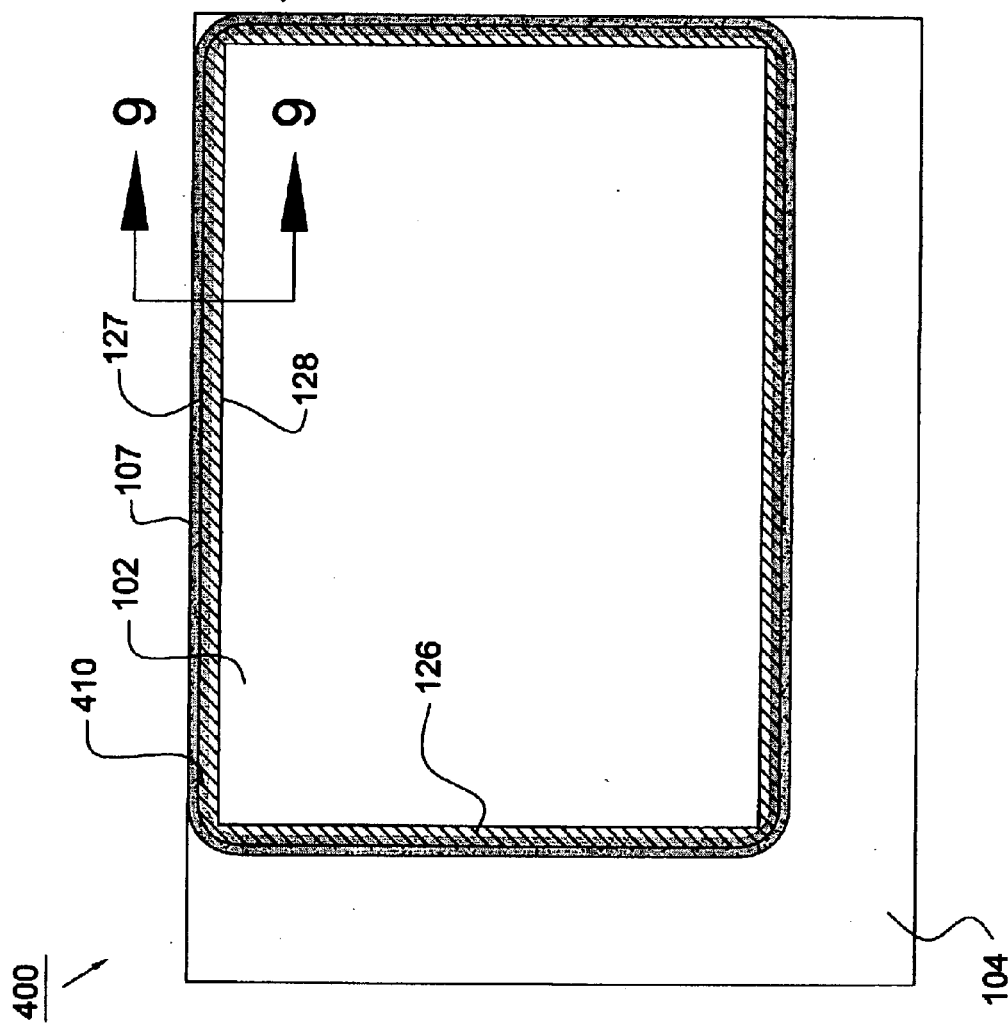
FIG. 8 is a plan view of a liquid crystal display device according to a fourth embodiment of the present invention.
Figure 10:
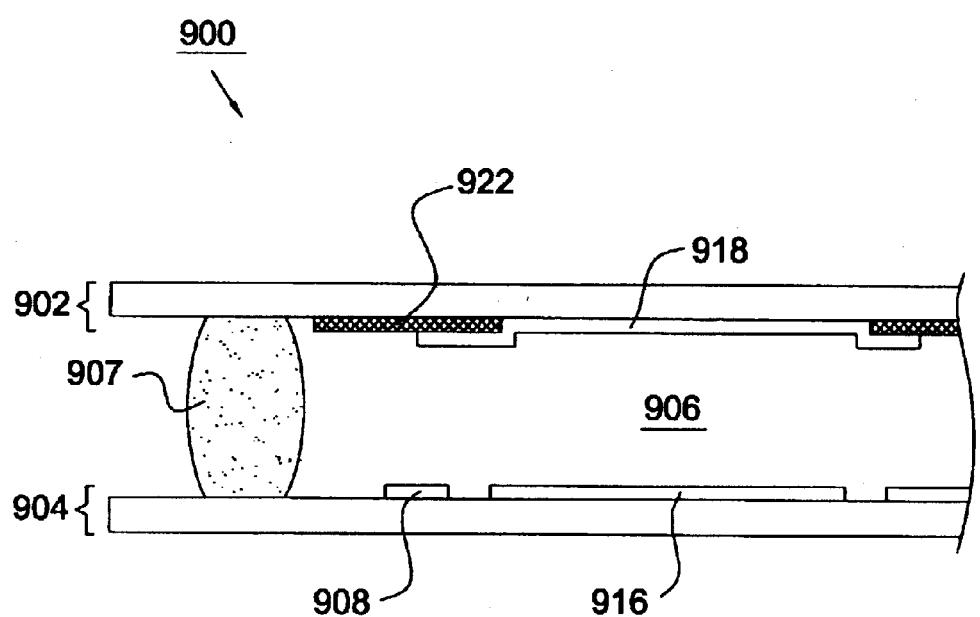
FIG. 10 is a sectional view of a portion of a conventional liquid crystal display device.

FIGS. 8–9 shows a liquid crystal display device 400 according to a fourth embodiment of the present invention. The liquid crystal display device 400 is substantially identical to the liquid crystal display device 300 shown in FIGS. 6–7 with an exception that the substrate 104 further comprises an opaque pattern 410 formed along the outer contour 127 of the light-shielding frame 126 thereby helping to prevent deterioration of contrast deriving from leakage of light passing through the vicinity of the edge of the light-shielding frame 126. Specifically, the opaque pattern 410 may be formed from any metal layer provided on the second substrate 104, e.g., the gate metal layer, the data metal layer or the metal layer constructed conductively to be fed with a common voltage (Vcom).

Although the invention has been explained in relation to its preferred embodiment, it is to be understood that many other possible modifications and variations can be made without departing from the spirit and scope of the invention as hereinafter claimed.

What is claimed is:

1. A liquid crystal display device, comprising:
   a first substrate;
   a second substrate;
   a liquid crystal layer sandwiched between the first and the second substrates;
   a radiation-cured sealant for attaching the first substrate to the second substrate; and
   a light-shielding frame having an inner contour defining a display area and an outer contour having at least one corner being formed into a nonrectangular shape, wherein at least a portion of the radiation-cured sealant overlaps the light-shielding frame and covers the outer contour of the light-shielding frame and the second substrate comprises an opaque pattern formed in a position facing the corners of the outer contour of the light-shielding frame and outside the display area.

2. The liquid crystal display device as claimed in claim 1, wherein the light-shielding frame is a portion of a black matrix.

3. The liquid crystal display device as claimed in claim 1, wherein the radiation-cured sealant is a ultra-violet light curable sealant.

4. The liquid crystal display device as claimed in claim 1, wherein the width of the radiation-cured sealant is substantially larger than the width of an overlapping area between the radiation-cured sealant and the light-shielding frame.

5. The liquid crystal display device as claimed in claim 4, wherein the width of the overlapping area is substantially kept at most half of the width of the radiation-cured sealant.

6. The liquid crystal display device as claimed in claim 1, wherein the radiation-cured sealant has at least one round corner corresponding to the nonrectangular corner of the outer contour of the light-shielding frame.

7. The liquid crystal display device as claimed in claim 1, wherein the inner contour of the light-shielding frame has at least one corner being formed into a rectangular shape.

8. A liquid crystal display device, comprising:
a first substrate;
a second substrate;
a liquid crystal layer sandwiched between the first and the second substrates;
a radiation-cured sealant for attaching the first substrate to the second substrate; and
a light-shielding frame having an inner contour defining a display area and an outer contour having at least one corner being formed into a nonrectangular shape,
wherein at least a portion of the radiation-cured sealant overlaps the light-shielding frame and covers the outer contour of the light-shielding frame, and the second substrate further comprises an opaque pattern formed along the outer contour of the light-shielding frame and outside the display area.

9. A liquid crystal display device, comprising:
a first substrate having a display area;
a second substrate;
a liquid crystal layer sandwiched between the first and the second substrates;
a radiation-cured sealant located in the vicinity of the display area of the first substrate for attaching the first substrate to the second substrate; and
a light-shielding frame sandwiched between the first substrate and the radiation-cured sealant and having an outer counter with at least one corner being formed into a nonrectangular shape,
wherein the second substrate further comprises an opaque pattern formed in a position facing the corners of the outer contour of the light-shielding frame and outside the display area.

10. The liquid crystal display device as claimed in claim 9, wherein the radiation-cured sealant has at least one round corner corresponding to the nonrectangular corner of the outer contour of the light-shielding frame.

11. A liquid crystal display device, comprising:
a first substrate having a display area;
a second substrate;
a liquid crystal layer sandwiched between the first and the second substrates;
a radiation-cured sealant located in the vicinity of the display area of the first substrate for attaching the first substrate to the second substrate; and
a light-shielding frame sandwiched between the first substrate and the radiation-cured sealant and having an outer counter with at least one corner being formed into a nonrectangular shape,
wherein the second substrate further comprises an opaque pattern formed along the outer contour of the light-shielding frame and outside the display area.

12. A liquid crystal display device, comprising:
a first substrate having a display area;
a second substrate;
a liquid crystal layer sandwiched between the first and the second substrates;
a radiation-cured sealant with a first width located in the vicinity of the display area of the first substrate for attaching the first substrate to the second substrate; and
a light-shielding frame disposed on the first substrate, the light-shielding frame having an outer contour with the corners formed into a nonrectangular shape and having an overlapping area with a second width between the radiation-cured sealant,
wherein the first width is substantially larger than the second width and the second substrate further comprises an opaque pattern formed in a position facing the corners of the outer contour of the light-shielding frame and outside the display area.

13. The liquid crystal display device as claimed in claim 12, wherein the second width is substantially kept at most half of the first width.

14. The liquid crystal display device as claimed in claim 12, wherein the radiation-cured sealant has at least one round corner corresponding to the nonrectangular corner of the outer contour of the light-shielding frame.

15. A liquid crystal display device, comprising:
a first substrate having a display area;
a second substrate;
a liquid crystal layer sandwiched between the first and the second substrates;
a radiation-cured sealant with a first width located in the vicinity of the display area of the first substrate for attaching the first substrate to the second substrate; and
a light-shielding frame disposed on the first substrate, the light-shielding frame having an outer contour with the corners formed into a nonrectangular shape and having an overlapping area with a second width between the radiation-cured sealant,
wherein the first width is substantially larger than the second width and the second substrate further comprises an opaque pattern formed along the outer contour of the light-shielding frame and outside the display area.

16. A liquid crystal display device comprising:
a first substrate having a display area;
a second substrate;
a liquid crystal layer sandwiched between the first and the second substrates;
a radiation-cured sealant located in the vicinity of the display area of the first substrate for attaching the first substrate to the second substrate;

a light-shielding frame sandwiched between the first substrate and the radiation-cured sealant and having an outer contour with at least one corner being formed into a beveled corner, wherein the second substrate further comprises an opaque pattern formed in a position facing the corners of the outer contour of the light-shielding frame and outside the display area.

17. A liquid crystal display device comprising:

a first substrate having a display area;

a second substrate;

a liquid crystal layer sandwiched between the first and the second substrates;

a radiation-cured sealant located in the vicinity of the display area of the first substrate for attaching the first substrate to the second substrate;

a light-shielding frame sandwiched between the first substrate and the radiation-cured sealant and having an outer contour with at least one corner being formed into a beveled corner, wherein the second substrate further comprises an opaque pattern formed along the outer contour of the light-shielding frame and outside the display area.

* * * * *

UNITED STATES PATENT AND TRADEMARK OFFICE
CERTIFICATE OF CORRECTION

PATENT NO.    : 6,912,025 B2
DATED         : June 28, 2005
INVENTOR(S)   : Bi Ly Lin et al.

It is certified that error appears in the above-identified patent and that said Letters Patent is hereby corrected as shown below:

Column 6,
Line 59, "device comprising:" should read -- device, comprising: --.

Column 7,
Line 8, "device comprising:" should read -- device, comprising: --.

Signed and Sealed this

Eighth Day of November, 2005

JON W. DUDAS
*Director of the United States Patent and Trademark Office*